United States Patent [19]

Cucheran et al.

[11] Patent Number: 5,143,267
[45] Date of Patent: Sep. 1, 1992

[54] ARTICLE CARRIER

[75] Inventors: John S. Cucheran, 931 Lakeshore Dr., Lake Orion, Mich. 48236; John A. Bott, Grosse Pointe Shores, both of Mich.

[73] Assignee: John A. Bott

[21] Appl. No.: 550,107

[22] Filed: Jul. 6, 1990

Related U.S. Application Data

[63] Continuation-in-part of Ser. No. 246,770, Sep. 20, 1988, Pat. No. 4,972,983.

[51] Int. Cl.⁵ ............................................. B60R 9/04
[52] U.S. Cl. ..................................... 224/321; 224/326
[58] Field of Search ............... 224/326, 325, 321, 309, 224/315, 329, 330, 331, 324, 323, 316, 327; 410/104, 105, 113, 150; 296/180.1, 90; 248/503

[56] References Cited

U.S. PATENT DOCUMENTS

| | | |
|---|---|---|
| Re. 26,539 | 3/1969 | Bott . |
| 3,542,264 | 11/1970 | Meyer et al. . |
| 3,554,416 | 1/1971 | Bott . |
| 4,099,658 | 7/1978 | Bott . |
| 4,133,465 | 1/1979 | Bott . |
| 4,162,755 | 7/1979 | Bott . |
| 4,170,322 | 10/1979 | Bott . |
| 4,182,471 | 1/1980 | Bott . |
| 4,269,340 | 5/1981 | Kowalski et al. . |
| 4,274,570 | 6/1981 | Bott . |
| 4,295,587 | 10/1981 | Bott . |
| 4,323,182 | 4/1982 | Bott . |
| 4,364,500 | 12/1982 | Bott . |
| 4,406,386 | 9/1983 | Rasor et al. . |
| 4,431,123 | 2/1984 | Bott . |
| 4,456,158 | 6/1984 | Wertz et al. . |
| 4,460,116 | 7/1984 | Bott . |
| 4,473,178 | 9/1984 | Bott . |
| 4,500,020 | 2/1985 | Rasor . |
| 4,516,710 | 5/1985 | Bott . |
| 4,684,048 | 8/1987 | Bott . |
| 4,754,905 | 7/1988 | Bott . |
| 4,877,168 | 10/1989 | Bott . |
| 4,883,208 | 11/1989 | Bott . |
| 4,911,348 | 3/1990 | Rasor . |

FOREIGN PATENT DOCUMENTS 2925684 1/1981 Fed. Rep. of Germany .
3528569 2/1987 Fed. Rep. of Germany .

Primary Examiner—Linda J. Sholl
Attorney, Agent, or Firm—Harness, Dickey & Pierce

[57] ABSTRACT

The present invention is an article carrier for an automobile including two side rails fixedly secured on a generally horizontal extending exterior automobile body surface. The side rails extend generally longitudinally of the automobile. A pair of bracket members are disposed on the side rails and a crossbar extends laterally between and secured adjacent its opposite ends to the bracket members. A spring member on each of the bracket members cooperates with notches in a channel member of the side rails for detachably securing and longitudinally adjusting the crossbar upon the side rails.

28 Claims, 4 Drawing Sheets

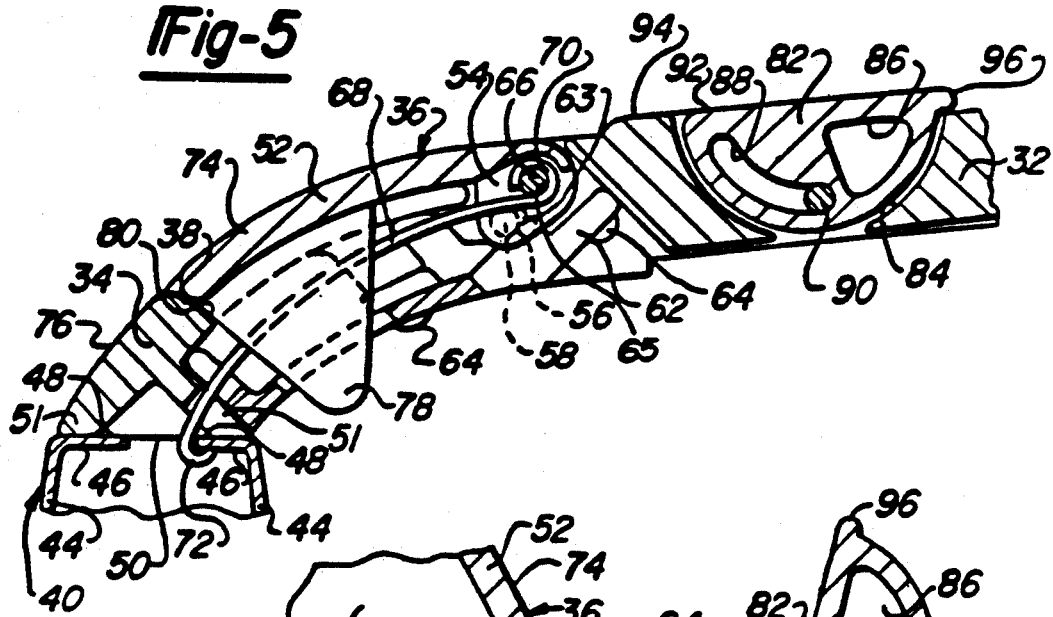
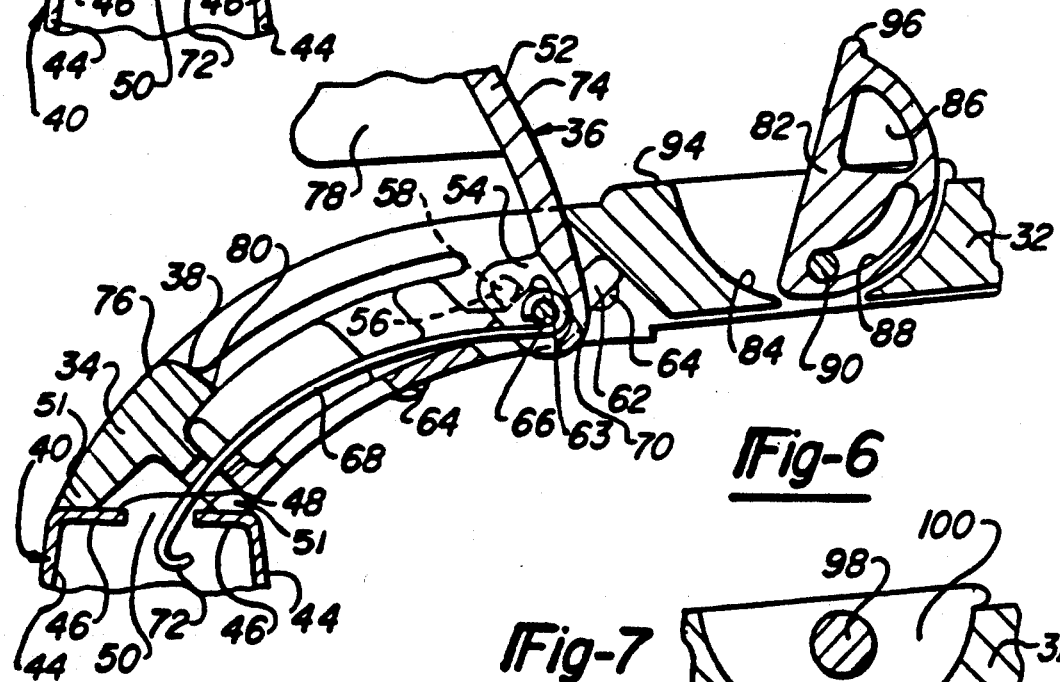
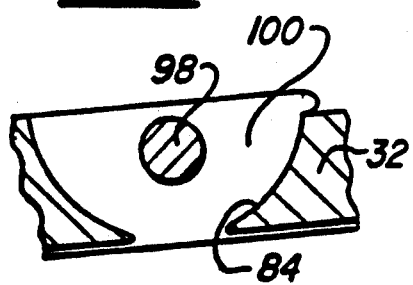
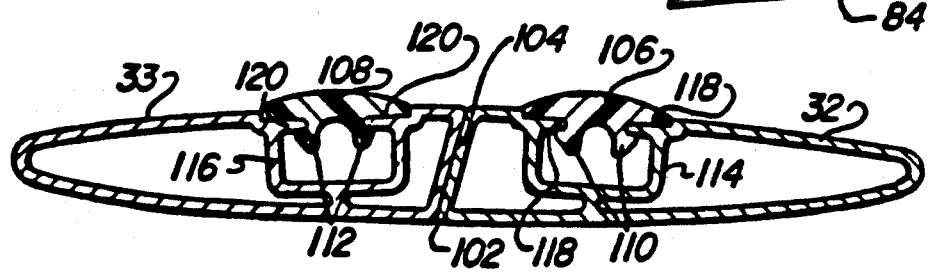

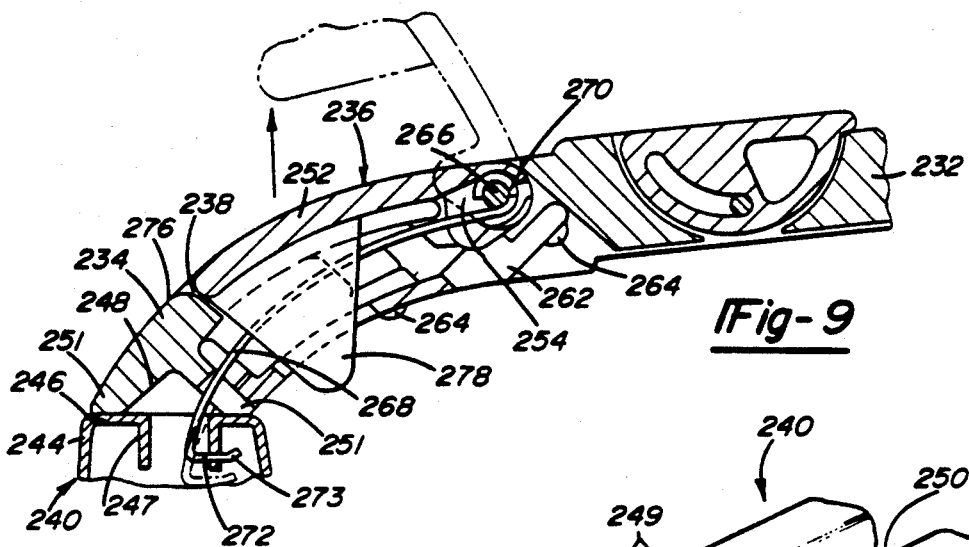
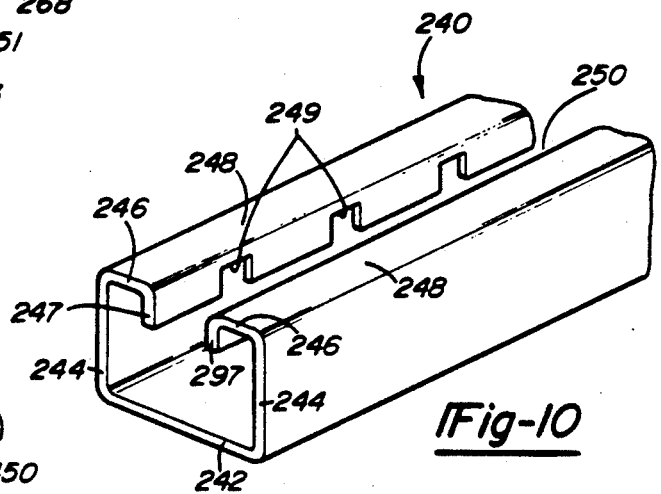
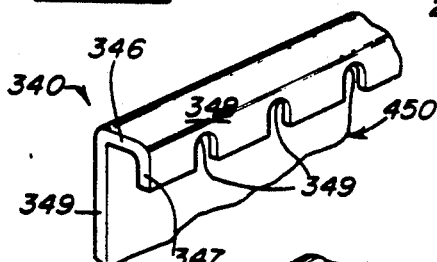
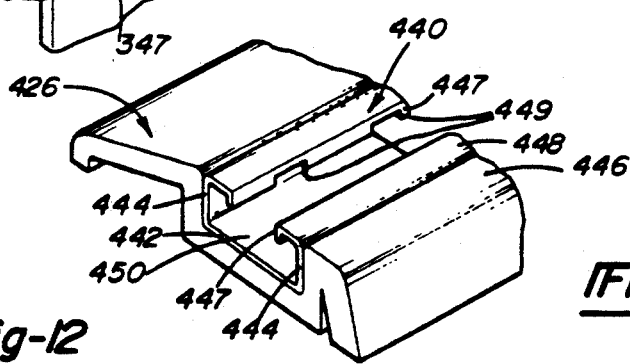
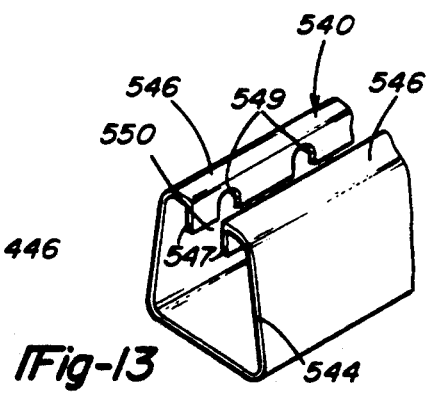
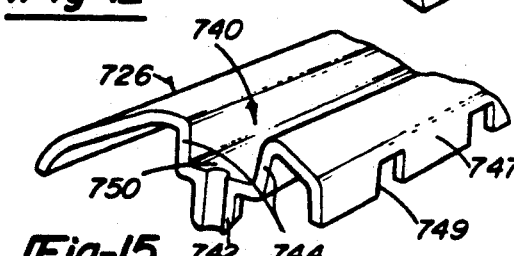
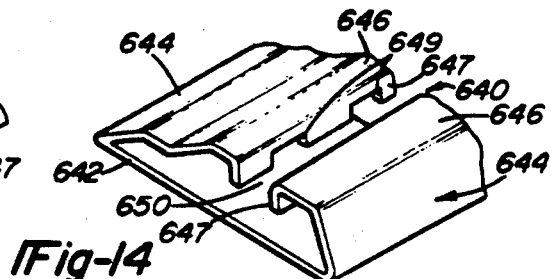

5,143,267

ARTICLE CARRIER

CROSS-REFERENCE TO RELATED APPLICATIONS

The present application is a continuation-in-part application of Ser. No. 246,770, filed Sep. 20, 1988, and entitled "ARTICLE CARRIER" now U.S. Pat. No. 4,972,983 issued Nov. 27, 1990.

BACKGROUND OF THE INVENTION

1. Field of the Invention

The present invetion relates to an article carrier for automotive vehicles, more particularly, to an adjustable crossbar for an article carrier on an automotive vehicle.

2. Description of Related Art

Automobile luggage racks frequently employ two separate subassemblies or portions: a rectangular framework which surrounds the load to be carried and a plurality of slats which rest on the roof or other automobile body surface and carries the weight of the load. In such constructions, the framework and the slats are often secured to the automobile body independently of one another. In still another automobile luggage or article carrier, a cross bar replaces the framework as a means for confining the luggage upon the slats.

In prior U.S. Pat. No. 4,182,471, an article carrier for automotive vehicles was disclosed having crossbars which can be adjusted on the slats and are easily removed, interchanged or adjusted in position on the slats in accordance with the needs of the user. This construction has achieved significant commercial success. Nevertheless, some problems have been experienced in providing an aesthetically pleasing and more simple to use rack. Therefore, it is believed that a need exists for a crossbar which has an attractive appearance of modern luggage carriers but which possesses a greater degree of adjustability and ease of operation. It is also believed that a need exists for a crossbar that can be stored when not in use and act as an air foil. It is further believed that a need exists for a crossbar that is prevented from significant longitudinal movement once it is adjusted and secured in place.

SUMMARY OF THE INVENTION

The present invention is an article carrier for an automobile including two side rails fixedly secured on a generally horizontal extending exterior automobile body surface. The side rails extend generally longitudinally of the automobile. The side rails include means forming a channel member. A pair of bracket members are disposed on the side rails and a restraining bar extends laterally between and secured adjacent its opposite ends to the bracket members. A means on each of the bracket members cooperates with the side rails for detachably securing and longitudinally adjusting the restraining bar at infinite positions along the side rails. The channel members include means for cooperating with the means on the bracket members to prevent longitudinal movement of the restraining bar relative to the side rails once adjusted and secured in position.

One advantage of the present invention is a crossbar or restraining bar which is attractive in appearance with a greater degree of adjustability and ease of operation. Another advantage of the present invention is a crossbar that can be stored when not in use at one end of the luggage rack and act as an airfoil. A further advantage of the present invention is that a clasp or spring member of the bracket member engages a flange on the channel member to be locked or secured in place and under load may slide to the first adjacent notches in the channel member and positively engage the notch to prevent longitudinal movement of the crossbar relative to the side rail.

Other objects, features and advantages of the present invention will be readily appreciated as the same becomes better understood when viewed in light of the following description and accompanying drawings.

BRIEF DESCRIPTION OF THE DRAWINGS

FIG. 5 is a sectional view of the structure illustrated in FIG. 3 taken along line 5—5 thereof showing a locking member in a closed position.

FIG. 6 is a view of the structure similarly illustrated in FIG. 5 showing the locking member in an open position.

FIG. 7 is a sectional view of an alternate tie-down member of the structure illustrated in FIGS. 5 and 6.

FIG. 8 is a sectional view of the structure illustrated in FIG. [4] 1 taken along line 8—8 thereof.

FIG. 9 is a view similar to FIG. 5 incorporating a channel member and spring member according to the present invention.

FIG. 10 is a perspective view of the channel member of FIG. 9.

FIG. 11 is a partial perspective view of a first alternate embodiment of the channel member of FIG. 10.

FIG. 12 is a perspective [an end] view of a second alternate embodiment of the channel member of FIG. 10.

FIG. 13 is a perspective [an end] view of a third alternate embodiment of the channel member of FIG. 10.

FIG. 14 is a perspective [an end] view of a fourth alternate embodiment of the channel member of FIG. 10.

FIG. 15 is a perspective view of a fifth alternate embodiment of the channel member of FIG. 10.

DESCRIPTION OF THE PREFERRED EMBODIMENT(S)

Figure 1:
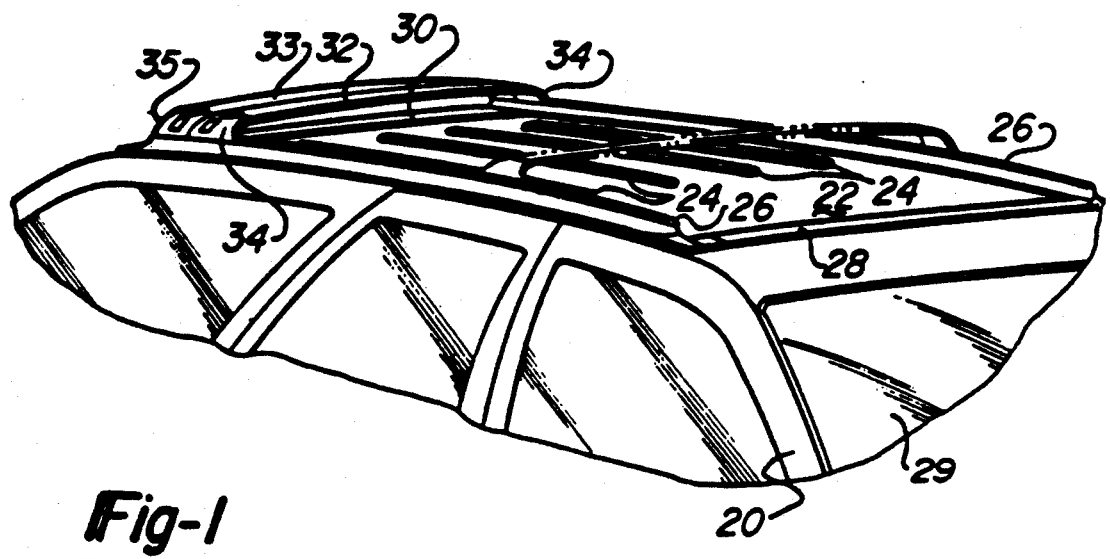
FIG. 1 is a fragmentary perspective view of an automobile showing an article carrier mounted thereon which is constructed in accordance with the principles of the present invention.

FIG. 1 depicts an automobile 20 having a roof 22 on which are mounted a plurality of identical, parallel, transversely spaced slats 24. Although the slats 24 are shown mounted on the roof 22, the article carrier of the present invention may be mounted with equal utility on an automobile trunk lid or any other generally horizontal exterior body portion of an automobile. The slats 24 are secured on the roof 22 by means such as sheet metal screws (not shown), pop rivets, rivet nuts or the like. The article carrier also includes a pair of parallel, transversely spaced side rails 26. Each of the side rails 26 are disposed on the other side of the outermost slat 24 such that the slats 24 are transversely spaced between the side rails 26. A front rail member 28 is disposed between and generally perpendicular to the front ends of the side rails 26. A rear rail member 30 is disposed between and generally perpendicular to the rear ends of the side rails 26. The side rails 26 and rail members 28 and 30 are secured on the roof 22 by means of sheet metal screws (not shown). Mounted on the side rails 26 are a pair of raised tubular restraining bars or crossbars 32 and 33 which are fitted at their opposite ends onto bracket members or brackets 34 and 35, respectively.

Figure 2:
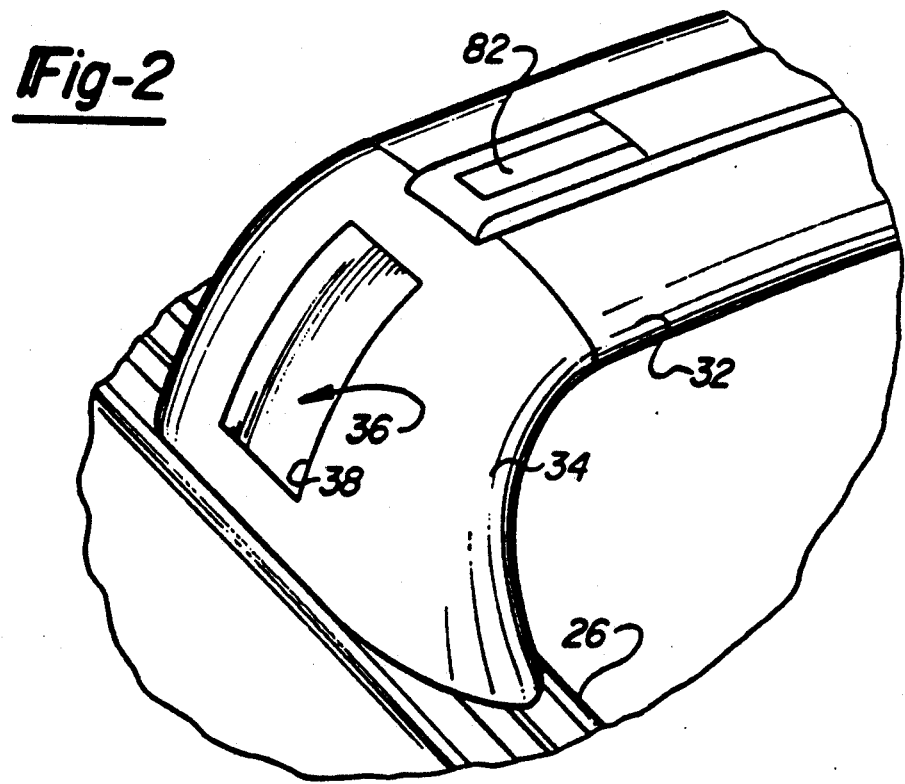
FIG. 2 is an enlarged perspective view of a portion of the structure illustrated in FIG. 1.

FIG. 2 depicts only one of the brackets 34 and a portion of the crossbar 32. Brackets 35 and crossbar 33 are similar structurally and functionally to brackets 34 and crossbar 32. The differences between these members will be explained further subsequently. The bracket 34 includes a locking member 36 for locking the crossbar 32 into position along the side rail 26. The locking member 36 allows the crossbar 32 to be positioned operably at any location or infinitely along the length of the side rail 26. When not in use, the locking member 36 is pivotally disposed to a closed position stored within a cavity or pocket 38 of the bracket 34 as illustrated in FIG. 5.

Referring to FIGS. 3 through 6, the side rail 26 includes a channel member 40. The channel member 40 comprises a bottom wall 42 and a pair of generally parallel upwardly extending side walls 44 with inwardly extending ledges 46 at the upper ends of the side walls 44. The ledges 46 include an upper supporting surface 48. The bottom and side walls 42 and 44 and ledges 46 form an upwardly opening channel 50 which is wider at its bottom than at the top. The bracket 34 includes a pair of laterally spaced feet 51 at the bottom thereof which slide along the upper supporting surface 48 of the channel member 40. The feet 51 form a configuration similar to a triangle in cross section.

Figure 3:
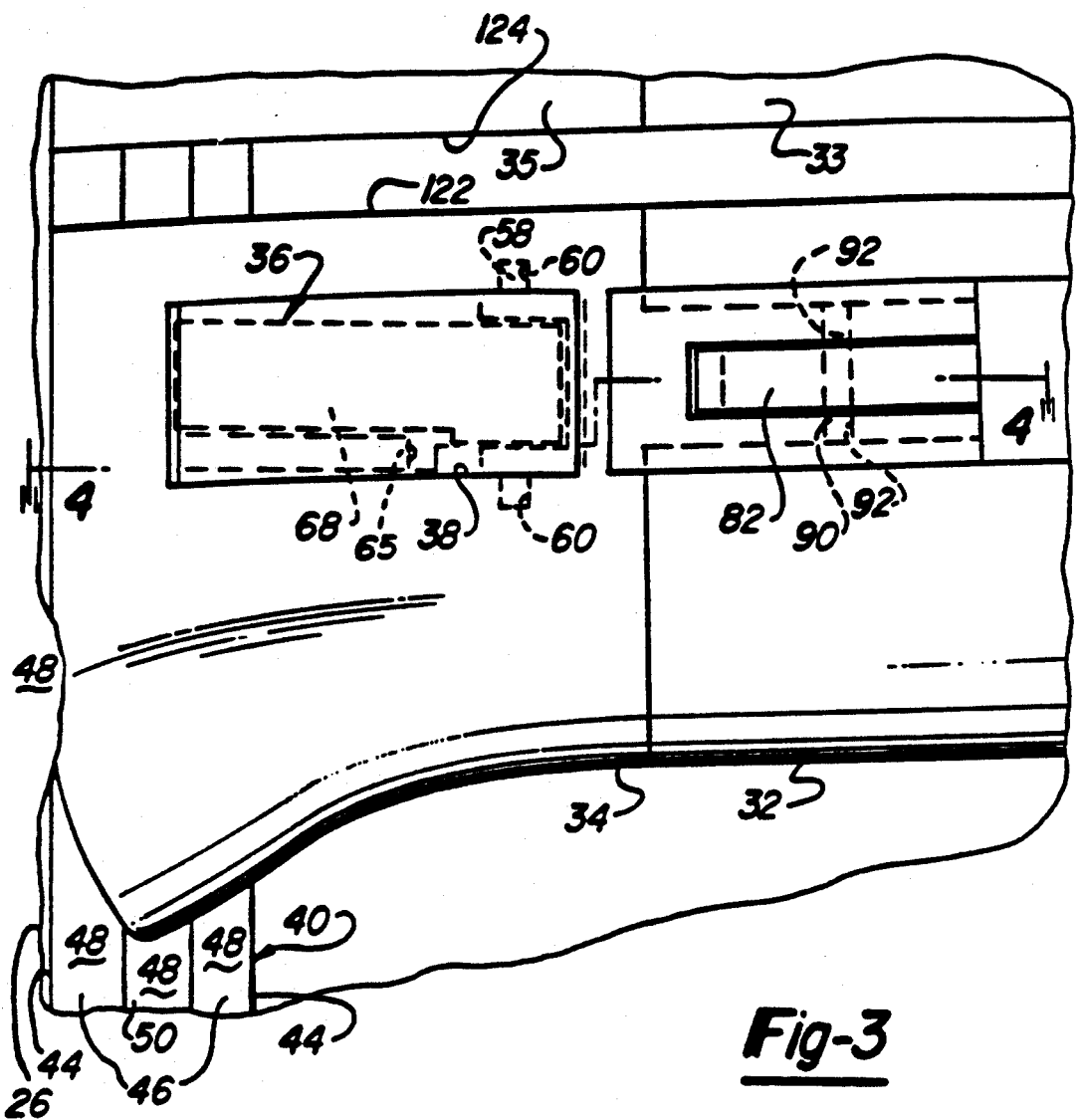
FIG. 3 is a plan view of the structure illustrated in FIG. 2.
Figure 4:
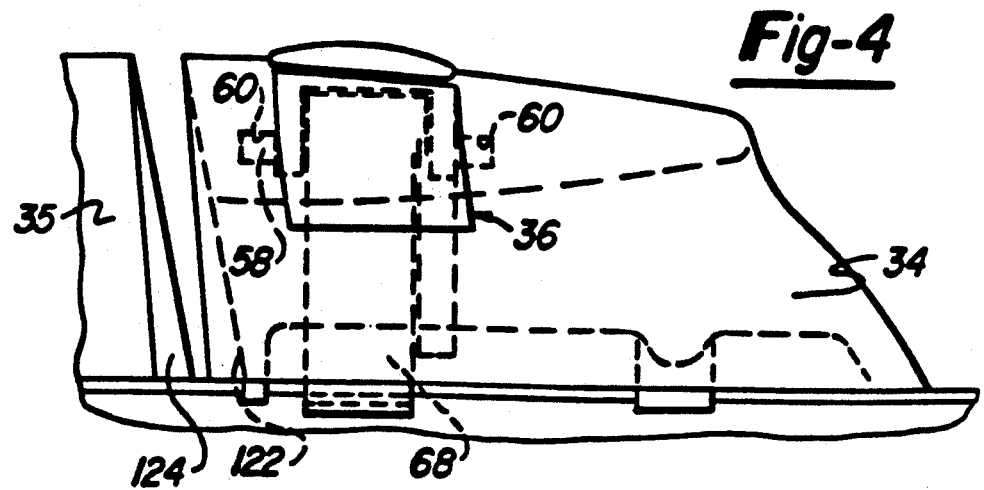
FIG. 4 is a side elevational view of the structure illustrated in FIG. 3.

The locking member 36 comprises a wall portion 52 and a base portion 54 at one end of the wall portion 52. The base portion 54 includes means forming a first aperture 56 therein and a corresponding shaft 58 passing through the first aperture 56. The shaft 58 has its ends disposed in corresponding second apertures 60 formed in the bracket 34 (FIGS. 3 and 4). A retainer member 62 which is secured by screws 64 to the bracket 34 such that a shoulder 63 retains the corresponding shaft 58 in the second apertures 60. The shaft 58 allows the locking member 36 to be manually moved or rotated from a closed locking position of FIG. 5 to an open unlocked position of FIG. 6.

The locking member 36 also includes means forming a third aperture 65 transversely in the base portion 54. A second shaft 66 is disposed in the third aperture 65. A spring member 68 has one end 70 wrapped or disposed about the second shaft 66 and a U-shaped end 72 opposite the one end 70 which cooperates with the ledge 46 on the channel member 40. The spring member 68 flexes to engage the ledge 46 to secure the bracket 34 to the channel member 40 when the locking member 36 is in the closed position. As illustrated in FIG. 6, when the locking member 36 is moved to the open position, the spring member 68 flexes and the U-shaped end 72 of the spring member 68 disengages the ledge 46 to allow the bracket 34 to slide along the channel member 40 of the side rail 26.

Referring to the locking member 36, the wall portion 52 is generally arcuate and has an outer surface 74 which is generally flush with the outer surface 76 of the bracket 34 in the closed position. The wall portion 52 also includes a protrusion 78 which is generally triangular in cross section and extends inwardly toward the roof 22. The protrusion 78 passes through an aperture 80 formed in the bracket 34 when the locking member 36 is in the closed position.

As illustrated in FIGS. 5 and 6, the crossbar 32 includes a tie-down or article securing member 82 which has a generally hemi-spherical cross section and is disposed in a corresponding cavity 84 formed in the crossbar 32. The tie-down member 82 includes an eyelet 86 formed therein to allow a rope or the like to pass through it. The tie-down member 82 includes an arcuate slot 88 formed therein to allow a shaft member 90 to pass through it and is disposed in corresponding apertures 92 (FIG. 3) formed in the crossbar 32.

The tie-down member 82 pivots about the shaft member 90 and is limited by the ends of the slot 88. The tie-down member 82 pivots between a closed position of FIG. 5 and an open position of FIG. 6. In the closed position, the outer surface 92 is substantially flush with the outer surface 94 of the crossbar 32. The tie-down member 82 also includes a flange 96 at one end for limiting the pivotal movement of the tie-down member 34 to the closed position.

FIG. 7 depicts an alternate embodiment of the article securing or tie-down member. A shaft or pin 98 is disposed in the cavity 84 and fixedly secured by suitable means to the crossbar 32. This allows a rope or the like to pass through a passage 100 formed between the pin 98 and the wall forming the cavity 84.

Referring again to FIG. 1, an alternate embodiment of the article securing or tie-down member is shown. The tie-down member may be an aperture 99, shown in phantom lines, extending through the bracket 34. The aperture is molded as part of the bracket 34 and allows a rope or the like to pass through.

As illustrated in FIG. 8, the crossbars 32 and 33 have a generally elliptical cross-section with one end 102 and 104, respectively, being planar and inclined. The ends 102 and 104 operatively cooperate or mate with each other to allow the crossbars 32 and 33 to nest together as further illustrated in solid in FIG. 1. The crossbars 32 and 33 may be nested together and disposed at one end of the side rails 26 to act as an airfoil when not in use. This improves the aerodynamics of the article carrier.

The crossbars 32 and 33 also include corresponding plastic strips 106 and 108 having ends 110 and 112, respectively, disposed in channels 114 and 116 formed along the crossbars 32 and 33. The ends 110 and 112 are flexible and resilient such that when they are inserted into the channels 114 and 116, the ends 110 and 112 overlap ledges 118 and 120 of the channels 114 and 116, respectively.

Referring to FIGS. 3 and 4, the brackets 34 and 35 include one end 122 and 124 being planar and inclined. The ends 122 and 124 operatively cooperate or mate with each other to allow the crossbars 32, 33 and brackets 34, 35 to nest together in a nested position as illustrated in solid in FIG. 1. As shown in phantom, the crossbars 32, 33 and brackets 34, 35 can be placed in an unnested position.

Referring to FIGS. 9 and 10, a side rail (not shown) incorporating a channel member 240 according to the present invention is shown. Like parts of the side rail 26 have like numerals increased by two hundred (200). The channel member 240 has a generally horizontal bottom wall 242 and a pair of generally inclined upwardly extending side walls 244 with inwardly and generally horizontal extending ledges 246 at the upper ends of the side walls 244. The ledges 246 include an upper supporting surface 248. The channel member 240 also has downwardly and generally vertical extending flanges or lips 247 at the inner or free ends of the ledges 246. The flanges 247 include a plurality of notches 249 defined therein and spaced along the longitudinal length thereof. The notches 249 are generally rectangular in shape and extend upwardly from the free end of the lips 247. It should be appreciated that the notches 249 may be formed in only one of the lips 247, preferably the innermost lip, to cooperate with the spring member.

As illustrated in FIG. 9, the spring member 268 has one end 270 wrapped about the second shaft 266 and a generally L-shaped end 272 opposite the one end 270 which cooperates with the lip 247 of the channel member 240. The free end of the L-shaped end 272 may include a flange 273 extending upwardly. The spring member 268 may be made of a flat spring metal material and has a width less than the width of the notches 249.

In operation, the spring member 268 flexes to engage the lip 247 to secure the bracket 234 to the channel member 240 when the locking member 236 is in the closed position. If the bracket 234 is moved longitudinally, the L-shaped end 272 of the spring member 268 will engage the closest notch 249. The spring member 268 will then flex upwardly to dispose the L-shaped end 272 within the notch 249. The engagement of the spring member 268 in the notch 249 prevents the bracket 234 from moving longitudinally relative to the channel member 240. Alternatively, the bracket 234 may be adjusted such that the L-shaped end 272 of the spring member 268 engages a notch 249 and the spring member 268 flexes to dispose the L-shaped end 272 in the notch 249 when the locking member 236 is moved to the closed position. It should be appreciated that the notch has a suitable shape to cooperate with the spring member.

Referring to FIG. 11, a first alternate embodiment 340 of the channel member 240 is shown. Like parts of the channel member 240 have like numerals increased by one hundred (100). As shown, the notches 349 may be arcuate or semi-circular in shape. As a result, the spring member 368 may be a heavy gauge spring wire having a circular cross-section. The operation of this embodiment is the same as the embodiment 226 and 234 previously described for FIGS. 9 and 10.

Referring to FIG. 12, a second alternate embodiment 440 of the channel member 240 is shown. Like parts of the channel member 240 have like numerals increased by two hundred (200). In this embodiment, the channel member 440 has a cross-sectional width greater than its height. Also, the channel member 440 may be disposed into a molded shape side rail 426. The operation of this embodiment is the same as that previously described for FIGS. 9 and 10.

Referring to FIG. 13, a third alternate embodiment 540 of the channel member 240 is shown. Like parts of the channel member 240 have like numerals increased by three hundred (300). In this embodiment, the channel member 540 has a cross-sectional height greater than its width. The operation of this embodiment is the same as that previously described for FIGS. 9 and 10.

Referring to FIG. 14, a fourth alternate embodiment 640 of the channel member 240 is shown. Like parts of the channel member 240 have like numerals increased by four hundred (400). In this embodiment, the channel member 640 is roll-formed from a metal material and is formed with lip 647. The operation of this embodiment is the same as that previously described for FIGS. 9 and 10.

Referring to FIG. 15, a fifth alternate embodiment 740 of the channel member 240 is shown. Like parts of the channel member 240 have like numerals increased by five hundred (500). In this embodiment, the side rail 726 may be a molded plastic or die cast member. The side rail 726 has the channel member 740 integral therewith, but the lip 742 extends outwardly and downwardly such that it is outside as lateral of the channel 750. The lip 747 includes the notches 749. The operation of this embodiment is the same as that previously described for FIGS. 9 and 10.

The present invention has been described in an illustrative manner. It is to be understood that the terminology which has been used is intended to be in the nature of words of description rather than of limitation.

Obviously, many modifications and variations of the present invention are possible in light of the above teachings. Therefore, within the scope of the appended claims, the present invention may be practiced otherwise than as specifically described.

What is claimed is:

1. An article carrier for an automobile comprising:
   at least two side rails fixedly secured on a generally horizontally extending exterior automobile body surface;
   said side rails extending generally longitudinally of the automobile;
   said side rails each including means forming a channel member;
   a pair of bracket members disposed upon said side rails and at least one restraining bar extending laterally between and secured adjacent its opposite ends to said bracket members;
   each said channel member further including locking means for enabling said bracket members to be detachably secured at an infinite number of positions along said side rails;
   means on each of said bracket members and cooperable with each said locking means of each said channel member for detachably securing and longitudinally adjusting said bracket members and said restraining bar at infinite positions along said channel members; and
   each said channel member including integrally formed means for cooperating with said securing and adjusting means to enable fixed, locking engagement of said bracket members and said restraining bar at a plurality of predetermined positions along each said channel member;
   wherein each said channel member includes inwardly extending ledges which terminate to define a channel and flanges extending downwardly from said ledges; and
   wherein said means for cooperating with said securing and adjusting means of each said channel member includes a plurality of notches defined in one of said flanges and longitudinally spaced along said one of said flanges.

2. An article carrier as set forth in claim 1 wherein said means of said channel member comprises a locking member being manually moveable between a closed and open position for locking and unlocking and said bracket member at a position along said side rail.

3. An article carrier as set forth in claim 2 wherein said bracket member includes means forming a pocket, said locking member being disposed in said pocket.

4. An article carrier as set forth in claim 3 wherein said locking member has a wall portion with an upper surface substantially flush with the upper surface of said bracket member and a base portion at one end of said wall portion.

5. An article carrier as set forth in claim 4 including means for allowing said locking member to rotate between said open and closed positions.

6. An article carrier as set forth in claim 5 wherein said means for allowing said locking member to rotate between said open and closed positions comprises at least one shaft, said base portion being disposed about said shaft.

7. An article carrier as set forth in claim 6 including retaining means for retaining said shaft to said bracket member.

8. An article carrier as set forth in claim 7 including spring means being flexible for engaging and disengaging said flange of said channel member.

9. An article carrier as set forth in claim 8 wherein said spring means comprises a spring member having one end disposed about said shaft and another end having an L-shaped portion for engaging said flange and said notches of said channel member.

10. An article carrier as set forth in claim 1 wherein said channel member has a cross-sectional height greater than its width.

11. An article carrier as set forth in claim 1 wherein said channel member has a cross-sectional width greater than its height.

12. An article carrier as set forth in claim 1 wherein said channel member is fabricated of a roll-formed material.

13. An article carrier as set forth in claim 1 wherein said notches are rectangular in shape.

14. An article carrier as set forth in claim 1 wherein said notches are arcuate in shape.

15. An article carrier as set forth in claim 7 including spring means operatively connected to said locking member and being flexible for engaging and disengaging said flange of said channel member.

16. An article carrier as set forth in claim 8 wherein said spring means comprises a spring member having one end with an L-shaped portion for engaging said notches of said channel member.

17. An article carrier for an automobile comprising:
a pair of parallel channel members secured on a generally horizontally extending exterior automobile body surface;
said pair of parallel channel members extending generally longitudinally of the automobile;
a pair of bracket members disposed upon said pair of parallel channel members and at least one restraining bar extending laterally between and secured adjacent its opposite ends to said bracket members;
means on each of said bracket members and cooperable with said pair of parallel channel members for detachably securing and longitudinally adjusting said bracket members and said restraining bars infinitely along said pair of parallel channel members;
each one of said pair of parallel channel members including inwardly extending ledges which terminate to define a channel and flanges extending downwardly from said ledges and integrally formed means forming a plurality of notches in at least one of said flanges and longitudinally spaced therealong to cooperate with said securing and adjusting means to enable fixed, locking engagement of said bracket members at a plurality of predetermined positions along said channel;
wherein said means comprises a locking member being manually moveable between a closed and open position for locking and unlocking said bracket member at a position along said slat;
spring means operatively connected to said locking member and being flexible for engaging and disengaging said flange of said channel member; and
wherein said spring means comprises a spring member having one end with a width less than a width of said notches engaging said notches of said channel member.

18. An article carrier for an automobile comprising:
at least two side rails fixedly secured on a generally horizontally extending exterior automobile body surface;
said side rails extending generally longitudinally of said automobile;
said side rails each including means forming a channel member;
a pair of bracket members disposed upon said side rails and at least one restraining bar extending laterally between and secured adjacent its opposite ends to said bracket members;
said channel member further including inwardly extending ledges which terminate to define a channel and flanges extending downwardly from said ledges for enabling said bracket members to be detachably secured at an infinite number of positions along said channel member;
one of said flanges further having a plurality of notches integrally formed therewith and longitudinally spaced therealong for cooperating with said securing and adjusting means to enable fixed, locking engagement of said bracket members and said restraining bar at a plurality of predetermined positions along said side rails.

19. An article carrier as set forth in claim 18 wherein said means comprises a locking member being manually moveable between a closed and open position for locking and unlocking and said bracket member at a position along said side rail.

20. An article carrier as set forth in claim 19 wherein said bracket member includes means forming a pocket, said locking member being disposed in said pocket.

21. An article carrier as set forth in claim 20 wherein said locking member has a wall portion with an upper surface substantially flush with the upper surface of said bracket member and a base portion at one end of said wall portion.

22. An article carrier as set forth in claim 21 including means for allowing said locking member to rotate between said open and closed positions.

23. An article carrier as set forth in claim 22 wherein said means for allowing said locking member to rotate between said open and closed positions comprises at least one shaft, said base portion being disposed about said shaft.

24. An article carrier as set forth in claim 23 including retaining means for retaining said shaft to said bracket member.

25. An article carrier as set forth in claim 24 including spring means being flexible for engaging and disengaging said flange of said channel member.

26. An article carrier as set forth in claim 25 wherein said spring means comprises a spring member having one end disposed about said shaft and another end having an L-shaped portion for engaging said flange and said notches of said channel member.

27. An article carrier as set forth in claim 26 wherein said notches are rectangular in shape.

28. An article carrier as set forth in claim 27 wherein said notches are arcuate in shape.

* * * * *